US012712970B2

(12) United States Patent
Mahajan et al.

(10) Patent No.: US 12,712,970 B2
(45) Date of Patent: Aug. 18, 2026

(54) SYSTEM AND METHOD FOR GENERATING USER SPECIFIC INTERACTIVE VOICE RESPONSES BASED ON USER SPEECH AND VOICE CHARACTERISTICS

(71) Applicant: Bank of America Corporation, Charlotte, NC (US)

(72) Inventors: Nipun Mahajan, Lawrenceville, NJ (US); Leosinda Lebron, Jackson, NJ (US); Sushama Shelke, Mumbai (IN); Amit Mishra, Chennai (IN); Ayela Chughtai, New York City, NY (US); Yogesh Raghuvanshi, Pennington, NJ (US)

(73) Assignee: Bank of America Corporation, Charlotte, NC (US)

( * ) Notice: Subject to any disclaimer, the term of this patent is extended or adjusted under 35 U.S.C. 154(b) by 160 days.

(21) Appl. No.: 18/673,772

(22) Filed: May 24, 2024

(65) Prior Publication Data

US 2025/0365368 A1 Nov. 27, 2025

(51) Int. Cl.

| | |
|---|---|
| ***H04M 3/42*** | (2006.01) |
| ***G10L 15/16*** | (2006.01) |
| ***G10L 15/183*** | (2013.01) |
| ***H04M 3/493*** | (2006.01) |

(52) U.S. Cl.
CPC ........... *H04M 3/4936* (2013.01); *G10L 15/16* (2013.01); *G10L 15/183* (2013.01)

(58) Field of Classification Search
CPC ..... H04M 3/4936; G10L 15/16; G10L 15/183
USPC ........................................................ 379/88.01
See application file for complete search history.

(56) References Cited

U.S. PATENT DOCUMENTS

| | | | | |
|---|---|---|---|---|
| 7,970,615 | B2 | 6/2011 | Attwater et al. | |
| 9,336,782 | B1 * | 5/2016 | Patel | G10L 13/04 |
| 9,386,152 | B2 | 7/2016 | Riahi et al. | |
| 9,866,693 | B2 | 1/2018 | Tamblyn et al. | |
| 9,912,810 | B2 | 3/2018 | Segre et al. | |
| 10,049,676 | B2 | 8/2018 | Yeracaris et al. | |
| 10,091,355 | B2 | 10/2018 | Flores et al. | |

(Continued)

OTHER PUBLICATIONS

Nipun Mahajan, et al.; "System and method for dynamically adjusting interactive voice response features based on user speech characteristics;" U.S. Appl. No. 18/674,008, filed May 24, 2024.

*Primary Examiner* — Binh Kien Tieu

(57) ABSTRACT

A system includes a memory configured to store user profiles associated with a plurality of users and an interactive voice response (IVR) system configured to service calls. The system includes processors configured to receive a call from a first user, generate a first voice interaction configured to prompt the first user to perform an utterance of a second voice interaction, and detect the utterance of the second voice interaction. The processors are configured to execute a first machine-learning model trained to identify speech and voice characteristics of the first user and to generate a third voice interaction based on the identified speech and voice characteristics. In response to identifying an intent and one or more named entities of the request, the processors are configured to initiate the execution of one or more interactions with the first user profile in accordance with the identified intent and one or more named entities.

20 Claims, 4 Drawing Sheets

(56) References Cited

U.S. PATENT DOCUMENTS

| | | | | |
|---|---|---|---|---|
| 10,162,844 | B1 | 12/2018 | McCord et al. | |
| 10,586,539 | B2 | 3/2020 | Raanani et al. | |
| 10,694,038 | B2 | 6/2020 | Abraham et al. | |
| 10,715,668 | B1 | 7/2020 | Jayapalan et al. | |
| 10,728,384 | B1 | 7/2020 | Channakeshava et al. | |
| 10,750,019 | B1 | 8/2020 | Petrovykh et al. | |
| 10,810,997 | B2 | 10/2020 | Yeracaris et al. | |
| 10,957,325 | B2 | 3/2021 | Hergenroeder | |
| 11,245,793 | B2 | 2/2022 | McGann et al. | |
| 11,363,140 | B2 * | 6/2022 | Agarwal | H04M 1/724 |
| 11,605,384 | B1 * | 3/2023 | Dalton | G10L 15/08 |
| 11,646,035 | B1 * | 5/2023 | Fan | G10L 15/32 704/270.1 |
| 11,706,339 | B2 | 7/2023 | Adibi et al. | |
| 11,741,484 | B2 | 8/2023 | McCord | |
| 11,922,923 | B2 | 3/2024 | McCord et al. | |
| 2007/0100628 | A1 * | 5/2007 | Bodin | G10L 13/033 704/E13.004 |
| 2019/0193273 | A1 | 6/2019 | Favis et al. | |
| 2019/0378533 | A1 * | 12/2019 | Chao | G10L 17/02 |
| 2023/0130308 | A1 * | 4/2023 | Tranquill | H04M 3/4936 379/88.01 |
| 2024/0428619 | A1 * | 12/2024 | Zass | G06F 40/279 |
| 2025/0006182 | A1 * | 1/2025 | Ingel | G10L 15/063 |
| 2025/0124456 | A1 * | 4/2025 | Veerapandian | G06Q 10/10 |

* cited by examiner

SYSTEM AND METHOD FOR GENERATING USER SPECIFIC INTERACTIVE VOICE RESPONSES BASED ON USER SPEECH AND VOICE CHARACTERISTICS

TECHNICAL FIELD

The present disclosure relates generally to computer telephony integration (CTI) systems, and, more specifically, to a system and method for generating user specific interactive voice responses based on user speech and voice characteristics.

BACKGROUND

Computer telephony integration (CTI) systems are generally utilized to service large volumes of calls that may be received, for example, by an organization or a call center. For example, the CTI system may include any system suitable for linking incoming calls from caller users with one or more computing servers to automatically exchange information between the one or more computing servers and the caller users and/or to facilitate the exchange of information between a callee user and the caller users. Some CTI systems may include static and prerecorded voice menus, which may be overly generic and unresponsive to user requests.

SUMMARY

The system and methods implemented by the system as disclosed in the present disclosure provide technical solutions to the technical problems discussed above by providing systems and methods for generating user specific interactive voice responses based on user speech and voice characteristics. The disclosed system and methods provide several practical applications and technical advantages. Specifically, the present embodiments improve processor and memory computing resources of computer telephony integration (CTI) systems and interactive voice response (IVR) systems by providing an interactive voice response and generative artificial intelligence (AI) system that includes 1) a first generative machine-learning model trained and executed to identify one or more speech characteristics and one or more voice characteristics of a caller user and to generate a voice interaction based at least in part on the identified one or more speech characteristics or the identified one or more voice characteristics and 2) a second generative machine-learning model pretrained and executed to identify an intent and one or more named entities of a request of the caller user.

In this way, the interactive voice response and generative AI system as disclosed herein may respond to, and satisfy, various caller user requests in real-time or near real-time in accordance with a speech, voice, and speech rate pattern specifically suited and personalized to the caller user without accumulating large volumes of calls within a call queue system or rerouting large volumes of calls as otherwise required when caller users request to speak with service representatives. Additionally, because the interactive voice response and generative AI system more efficiently and more readily identifies intent and one or more named entities of a caller user requests by engaging with a caller user in a speech, voice, and speech rate pattern specifically suited and personalized to the caller user, the interactive voice response and generative AI system may decrease network traffic by seamlessly routing calls to appropriate automated services in accordance with the identified intent and one or more named entities as opposed to rerouting large volumes of calls to various service representatives. Thus, the present embodiments reduce execution time, latency, and processing workloads of processors, increase the storage compacity of system memory, and decrease network traffic.

The present embodiments are directed to systems and methods for generating user specific interactive voice responses based on user speech and voice characteristics. In particular embodiments, a memory may be configured to store a plurality of user profiles associated with a plurality of users and an interactive voice response (IVR) system configured to service calls with respect to the plurality of user profiles. In particular embodiments, one or more processors operably coupled to the memory may be configured to receive a call from a first user of the plurality of users. In one embodiment, the call may include a potential request to initiate an execution of one or more interactions with a first user profile associated with the first user.

In particular embodiments, the one or more processors may be further configured to generate, based at least in part on the call from the first user, a first voice interaction configured to prompt the first user to perform an utterance of a second voice interaction. In particular embodiments, the one or more processors may be further configured to detect, based at least in part on the first voice interaction, the utterance of the second voice interaction performed by the first user. In response to detecting the utterance of the second voice interaction, the one or more processors may be further configured to execute a first machine-learning model trained to identify one or more speech characteristics and one or more voice characteristics of the first user and to generate a third voice interaction based at least in part on the identified one or more speech characteristics or the identified one or more voice characteristics.

In particular embodiments, the identified one or more speech characteristics may include one or more of a language, an accent, a dialect, a speech context, a speech complexity, a pause rate, a word length, a word frequency, a syntactic depth, a use of particles, a use of nouns, or a use of pronouns. In particular embodiments, the identified one or more voice characteristics may include one or more of a tone, a pitch, a volume, a tempo, a timbre, a rate, a voice type, or a voice register. In particular embodiments, the first machine-learning model may include a first natural language processing (NLP) model trained or fine-tuned based on the identified one or more speech characteristics and the identified one or more voice characteristics.

For example, in one embodiment, the first natural language processing (NLP) model may include one or more of a bidirectional and auto-regressive transformer (BART) model, a bidirectional encoder representations for transformer (BERT) model, a knowledge enhanced bidirectional encoder representations for transformer (KnowBERT) model, a robustly optimized bidirectional encoder representations for transformer pretraining approach (RoBERTa) model, or a generative pre-trained transformer (GPT) model. In particular embodiments, the one or more processors may be further configured to execute a second machine-learning model trained to identify an intent and one or more named entities of a request of the first user based at least in part on the second voice interaction and the identified one or more speech characteristics or the identified one or more voice characteristics.

For example, in one embodiment, the second machine-learning model may include a second natural language processing (NLP) model pretrained to identify intent and one or more named entities from a plurality of different utterances of voice interactions performed by the plurality of users. In response to identifying the intent and the one or more named entities of the request of the first user, the one or more processors may be further configured to initiate the execution of the one or more interactions with the first user profile in accordance with the identified intent and the one or more named entities of the request. In one embodiment, the first machine-learning model may be further trained to generate the third voice interaction to reflect the identified one or more speech characteristics or the identified one or more voice characteristics of the first user. In particular embodiments, the one or more processors may be further configured to initiate the execution of the one or more interactions with the first user profile to execute a predetermined action.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
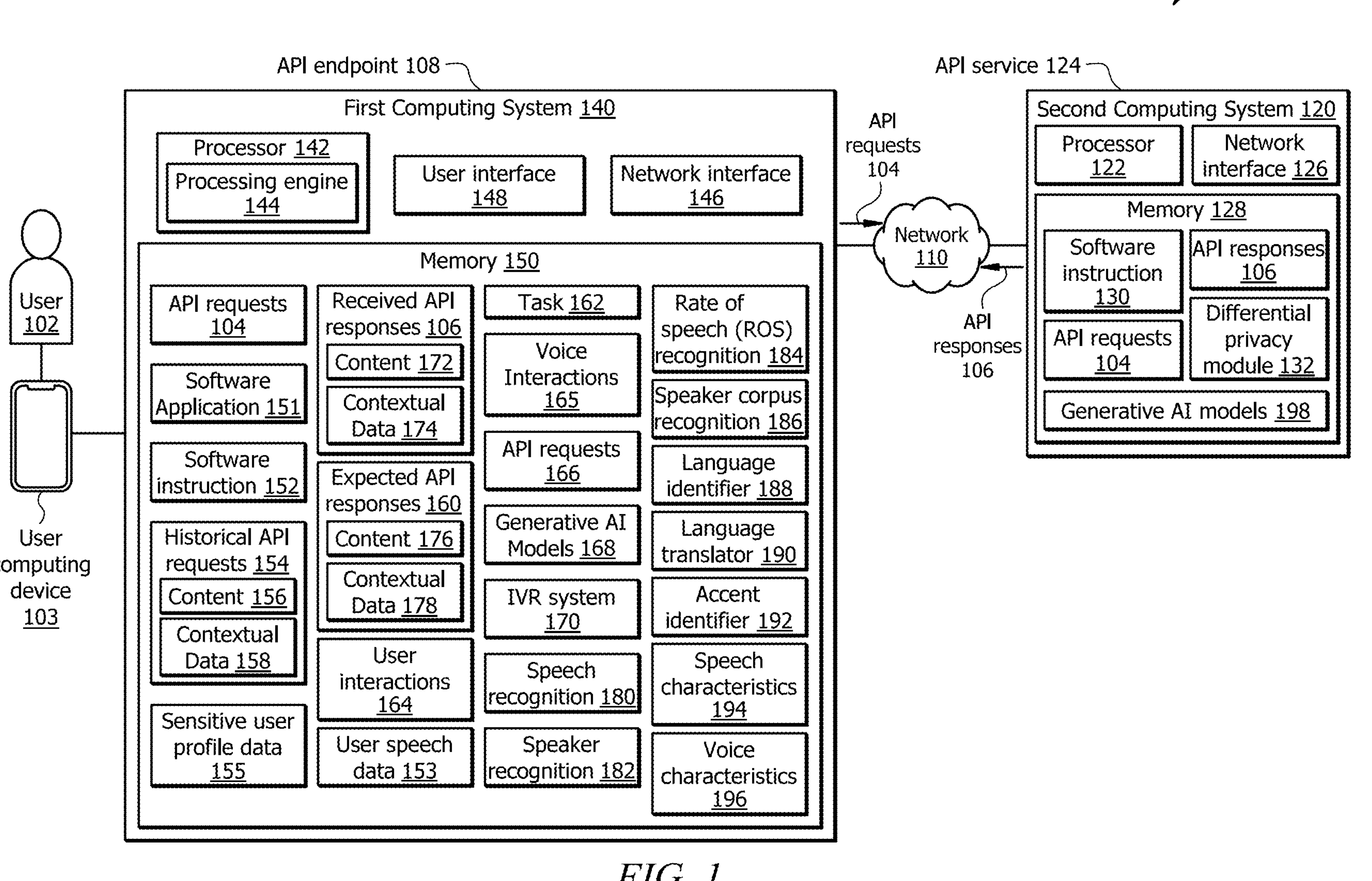
FIG. 1 is a block diagram of a computer telephony integration (CTI) and interactive voice response (IVR) system, in accordance with certain aspects of the present disclosure.

FIG. 1 is a block diagram of a computer telephony integration (CTI) and interactive voice response (IVR) system 100. As depicted, the CTI and IVR system 100 may include a caller user 102, a caller user computing device 103, a first computing system 140, a network 110, and a second computing system 120. In particular embodiments, the caller user 102 may include a user associated with an institution, an organization, or an entity and that is associated with the sensitive user profile data 155. The sensitive user profile data 155 that may be associated with one or more of a large number of users external to the institution, the organization, or the entity. The network 110 enables communications among components of the CTI and IVR system 100. In other embodiments, the CTI and IVR system 100 may not have all of the components listed and/or may have other elements instead of, or in addition to, those listed above.

In particular embodiments, the first computing system 140 may include a processor 142 in signal communication with a memory 150. The memory 150 stores software instructions 152 that when executed by the processor 142, cause the processor 142 to perform one or more functions described herein. For example, when the software instructions 152 are executed, the processor 142 executes a processing engine 144 to generate user specific interactive voice responses based on user speech characteristics 194 and voice characteristics 196 in accordance with the presently disclosed embodiments.

The CTI and IVR system 100 may be configured as shown, or in any other configuration. In accordance with the presently disclosed embodiments, the first computing system 140 may be suitable for generating user specific interactive voice responses based on speech characteristics 194 and voice characteristics 196. In one embodiment, the first computing system 140 may include a centralized or decentralized server of an institution, an organization, or an entity suitable for hosting and servicing a large number of users, such as the caller user 102 while utilizing the caller user computing device 103. Similarly, the second computing system 120 may, in some embodiments, include a third-party server or service that may be communicatively coupled to the first computing system 140 by way of the network 110.

System Components

Network

The network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Second Computing System

In particular embodiments, the second computing system 120 may include a computing system that may be utilized to process data and communicate with computing devices (e.g., the first computing system 140), databases, systems, etc., via the network 110 and may, in some embodiments, be associated with a third-party institution, organization, an entity. The second computing system 120 may be utilized to generate API responses 106 in response to receiving the API requests 104 and/or API requests 166. In particular embodiments, the second computing system 120 may include a processor 122 in signal communication with a network interface 126 and a memory 128. Memory 128 stores software instructions 130 that when executed by the processor 122, cause the second computing system 120 to perform one or more functions described herein. For example, when the software instructions 130 are executed, the second computing system 120 generates API responses 106 in response to receiving the API requests 104. The second computing system 120 may be configured as shown, or in any other configuration.

The processor 122 may include one or more processors operably coupled to the memory 128. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 126 and memory 128. The one or more processors are configured to process data and may be implemented in hardware or software.

For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 130 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

In particular embodiments, the processor 122 may execute one or more generative machine-learning models 198, such as one or more of a language model (LM), a large language model (LLM), one or more transformer-based machine-learning models, one or more sequence-to-sequence (Seq2Sec) models, or other similar generative machine-learning models 198. For example, in one embodiment, the one or more generative machine-learning models 198 may include a large pretrained language model that may, in some embodiments, be called by the first computing system 140 to operate in conjunction with one or more generative machine-learning models 168.

The network interface 126 is configured to enable wired and/or wireless communications (e.g., via the network 110). The network interface 126 is configured to communicate data between the second computing system 120 and other network devices, systems, or domain(s). For example, the network interface 126 may comprise a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol.

The memory 128 may be volatile or non-volatile and may include a read-only memory (ROM), random-access memory (RAM), ternary content-addressable memory (TCAM), dynamic random-access memory (DRAM), and static random-access memory (SRAM), or other non-transitory computer-readable medium. Memory 128 may be implemented using one or more disks, tape drives, solid-state drives, and/or the like. Memory 128 is operable to store the software instructions 130, API requests 104, API responses 106, differential privacy module 132, and/or any other data or instructions. The software instructions 130 may include any suitable set of instructions, logic, rules, or code operable to execute the processor 122.

The memory 128 may also store a second user data set 131 that may be associated with the second entity to which the second computing system 120 is associated. For example, in some embodiments, the second entity may include a second user profile configured to facilitate user interactions between the caller user 102 and a number of other users associated with the second entity, and thus the second user data set may include any data associated with the caller user 102 and servicing and facilitating user interactions between the caller user 102 and a number of other users associated with the second entity and the second computing system 120.

First Computing System

In particular embodiments, the first computing system 140 may include any computing system that may be utilized to process data and communicate with computing devices (e.g., second computing system 120), databases, systems, etc., via the network 110. The first computing system 140 may be utilized to oversee operations of the processing engine 144. The first computing system 140 is associated with an API endpoint 108 where API requests 104 are originated. In particular embodiments, the first computing system 140 may include the processor 142 in signal communication with a network interface 146, a user interface 148, and memory 150. The first computing system 140 may be configured as shown, or in any other configuration.

The processor 142 may include one or more processors operably coupled to the memory 150. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 may be communicatively coupled to and in signal communication with the network interface 146, user interface 148, and memory 150. The one or more processors may be utilized to process data and may be implemented in hardware, software, or some combination thereof.

For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors may be utilized to execute software instructions 152 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 146 may be utilized to enable wired and/or wireless communications (e.g., via the network 110). The network interface 146 may be utilized to communicate data between the first computing system 140 and other network devices, systems, or domain(s). For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol.

The memory 150 may be volatile or non-volatile and may include a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 may be operable to store the software instructions 152, historical API requests 154, API requests 104, user speech data 153, user interactions 164, voice interactions 165, received API responses 106, expected API responses 160, generated combinations of content 172, generated combination of contextual data 178, API requests 166, the one or more generative machine-learning models 168, task 162, interactive voice response (IVR) system 170, speech recognition component 180, speaker recognition component 182, rate of speech (ROS) recognition component 184, speaker corpus recognition component 186, language identifier component 188, language translator component 190, accent identifier component 192, speech characteristics 194, voice characteristics 196, and/or any other data or instructions. The software instructions 152 may include any suitable set of instructions, logic, rules, or code operable to execute the processor 142.

The memory 150 may also store instances of software application 151 that may be executing within the CTI and IVR system 100. In one embodiment, the instances of a software application 151 may include any number of instances a large software application suitable for hosting and servicing millions or billions of individual users and that may also interact via API requests 104 and API responses 106 with the computing system 120, and may be further associated with the sensitive user profile data 155.

Processing Engine

Processing engine 144 may be implemented by the processor 142 executing the software instructions 152, and may be utilized for generating user specific interactive voice responses based on user speech characteristics 194 and voice characteristics 196. In some embodiments, the processing engine 144 may access historical API requests 154. In some embodiments, the processing engine 144 may generate one or more API requests 104 based on content 156 and contextual data 158 associated with the historical API requests 154. In some embodiments, the processing engine 144 may send the API requests 104 to the second computing system 120. The second computing system 120 generates API responses 106 to the received API requests 104. The second computing system 120 sends the API responses 106 to the first computing system 140.

The processing engine 144 parses the API responses 106 and detects content 172 and contextual data 174 associated with the API responses 106. The processing engine 144 compares each received API response 106 with a counterpart expected API responses 160, where each received API response 106 and the counterpart expected API responses 160 is associated with the same API request 104 and/or task 162, such as generating a user account number.

The processing engine 144 determines whether a received API response 106 corresponds with its counterpart expected API responses 160. If the processing engine 144 determines that the received API response 106 does not correspond with the counterpart expected API responses 160, the processing engine 144 identifies the difference between the received API response 106 and the counterpart expected API responses 160. In other words, the processing engine 144 identifies user interactions 164 made to the received API response 106, where the user interactions 164 is made to the received API response 106 by the second computing system 120. In response, the processing engine 144 may update future API requests 166 associated with the particular task 162 according to the user interactions 164 made to the received API response 106.

Generating Combinations of Content and Contextual Data

The operational flow may begin at a training generation step where the processing engine 144 accesses the historical API requests 154, e.g., stored in the memory 150.

Each historical API request 154 may include content 156 and contextual data 158. For example, the content 156 associated with a historical API request 154 may include the data that is requested in the historical API request 154. In an example historical API request 154 that requests to generate a user account number for a user, the content 156 may include a name, a unique identifier number, phone number, address, user account number, and/or the like. The contextual data 158 associated with a historical API request 154 may include one or more a header, a trailer, an URL, a data format associated with the content 156, and/or the like.

The processing engine 144 identifies the content 156 and the contextual data 158 associated with the historical API requests 154. The processing engine 144 uses this information to generate the API requests 104. One reason for generating API requests 104 is to generate different combinations or different possibilities of content 172 and contextual data 178. Each combination of content 172 and contextual data 178 corresponds to one API request 104. In this manner, the processing engine 144 is able to detect any user interactions 164 made to any aspect of the process of generating API responses 106 compared to expected API responses 160.

In particular embodiments, the processing engine 144 may monitor the user speech data 153, user interactions 164, and/or voice interactions 165. In particular embodiments, the processing engine 144 may execute the one or more generative machine-learning models 168, such as one or more of a language model (LM), a large language model (LLM), one or more transformer-based machine-learning models, one or more sequence-to-sequence (Seq2Sec) models, or other similar generative machine-learning models 168. In particular embodiments, the user speech data 153, user interactions 164, and/or voice interactions 165 may include user interaction data captured in relation to a live natural language exchange session conducted electronically between the caller user 102 and IVR system 170.

In particular embodiments, the processing engine 144 may further train the one or more generative machine-learning models 168 based on the user speech data 153, user interactions 164, and/or voice interactions 165. For example, in one embodiment, the one or more generative machine-learning models 168 may include one or more lightweight language models that may be trained in real-time or near real-time and during the live natural language exchange session conducted electronically between the caller user 102 and IVR system 170.

In one embodiment, the processing engine 144 may vary the content 156 and the contextual data 158 among one or more API requests 104. In the example of an API requests 104 for generating a user account number for a user, to generate the combinations of content 172, the processing engine 144 may vary different data fields of the content 156, such as names, addresses, phone numbers, use account numbers, number of digits used in the user account numbers, etc. associated with the historical API requests 154. In the example of an API requests 104 for generating a user account number for a user, to generate the combinations of contextual data 178, the processing engine 144 may vary different data fields of the contextual data 158, such as headers, trailers, URLs, data formats, etc. associated with the historical API requests 154.

In some cases, a data field in content 172 and/or in contextual data 158 may not be generated synthetically and/or randomly. For example, zip codes associated with addresses (in content 156) may be predefined and not generated synthetically and/or randomly. In another example, names of cities associated with addresses (in content 156) may be predefined and not generated synthetically and/or randomly. In another example, the data format in contextual data 158 may be predefined and not generated synthetically and/or randomly. In such cases, the processing engine 144 may search in the data lexicon that includes data that is predefined and/or not generated synthetically and/or randomly. The processing engine 144 may fetch such data from the data lexicon and use it in the various combinations of content 172 and various combinations of contextual data 178.

Detecting User Speech and Voice

In particular embodiments, the caller user 102 may utilize the caller user computing device 103 to execute a telephonic call to the first computing system 140. In particular embodiments, the telephonic call may be serviced by the IVR system 170, which may interact with the caller user 102 via one or more voice responses. In particular embodiments, the caller user 102 may provide one or more of user speech data 153, user interactions 164, and voice interactions 165, which may all be provided during a live natural language exchange session conducted electronically between the caller user 102 and IVR system 170. In particular embodiments, one or more of the user speech data 153, the user interactions 164, and the voice interactions 165 may be captured and utilized by one or more of the one or more generative machine-learning models 168, the IVR system 170, the speech recognition component 180, the speaker recognition component 182, the rate of speech (ROS) recognition component 184, the speaker corpus recognition component 186, the language identifier component 188, the language translator component 190, and the accent identifier component 192.

Generating User Specific Interactive Voice Responses Based on User Speech and Voice Characteristics Embodiments of the present disclosure discuss techniques for generating user specific interactive voice responses based on user speech and voice characteristics.

Figure 2:
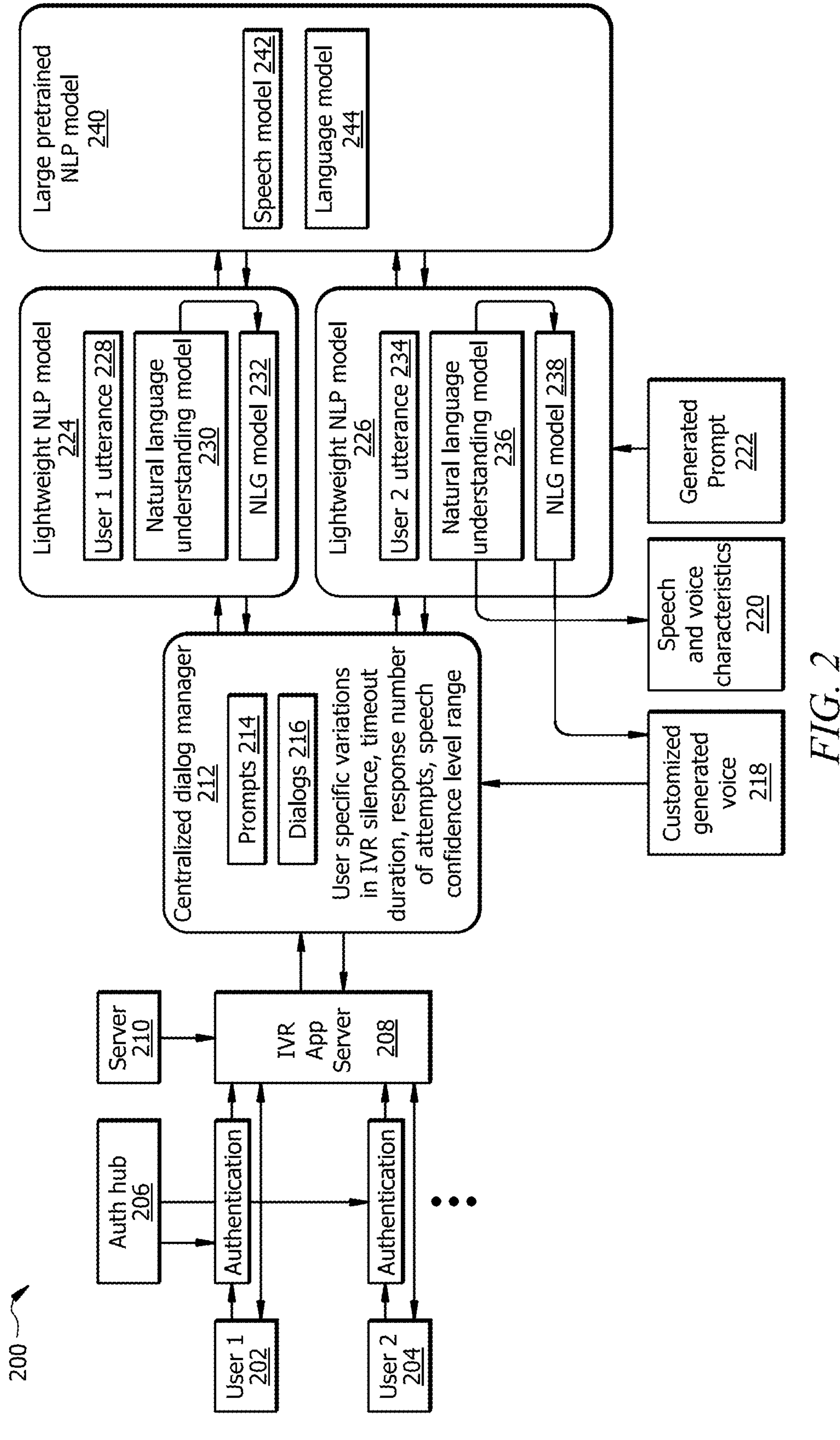
FIG. 2 illustrates a workflow diagram of an embodiment of an interactive voice response and generative artificial intelligence system, in accordance with one or more embodiments of the present disclosure.

FIG. 2 illustrates a workflow diagram of an embodiment of an interactive voice response and generative artificial intelligence (AI) system 200 for generating user specific interactive voice responses based on user speech and voice characteristics, in accordance with certain aspects of the present disclosure. In particular embodiments, the workflow the workflow of the interactive voice response and generative AI system 200 may be performed utilizing the first computing system 140 as described above with respect to FIG. 1. As used herein, a "telephonic call" may refer to any phone call or voice call in which a caller may communicate over a network in real-time or near real-time to a human callee or an automated voice response callee. For example, in one embodiment, a "telephonic call" may be transmitted from a caller and received by a callee over a public switched telephone network (PSTN), in which incoming calls or outgoing calls are routed over phone lines. In another embodiment, a "telephonic call" may be transmitted from a caller and received by a callee over a voice over internet protocol (VoIP) network, in which incoming calls or outgoing calls are routed over the internet.

As depicted, the workflow of the interactive voice response and generative AI system 200 may begin with a first caller user 202 and a second caller user 204 executing respective telephonic calls, which may be executed by the first caller user 202 and the second caller user 204 by dialing on a personal electronic device into a service number of an organization or a call center associated with hosting sensitive user profile data 155. It should be appreciated that the illustrated embodiment of the interactive voice response and generative AI system 200 may represent only one embodiment. Indeed, in other embodiments, the interactive voice response and generative AI system 200 may service any N number of incoming telephonic calls (e.g., thousands of incoming calls per day, millions of incoming calls per day, or tens of millions of incoming calls per day) from any N number of caller users.

Additionally, while the illustrated embodiment of the interactive voice response and generative AI system 200 includes a centralized dialogue manager 212 positioned between an interactive voice response (IVR) application server 208 and a respective first lightweight natural language processing (NLP) machine-learning model 224 and a second lightweight natural language processing (NLP) machine-learning model 226, in some embodiments, the centralized dialogue manager 212 may be only optionally included, and thus, in such embodiments, the IVR application server 208 may exchange data inputs and data outputs directly with the first lightweight NLP machine-learning model 224, the second lightweight NLP machine-learning model 226, any N number of lightweight machine-learning model In particular embodiments, the workflow of the interactive voice response and generative AI system 200 may continue with the respective telephonic calls of the first caller user 202 and the second caller user 204 being routed to an interactive voice response (IVR) application server 208 and associated web server 210. In particular embodiments, the IVR application server 208 may include any application server suitable for receiving speech, voice, and/or dual-tone multi-frequency (DTMF) inputs extracted from the respective telephonic calls of the first caller user 202 and the second caller user 204 and generating one or more voice interactions in response thereto in order to automatedly interact with the first caller user 202 and the second caller user 204.

For example, in one embodiment, the IVR application server 208 may initially prompt the first caller user 202 and the second caller user 204 to provide authentication information. In particular embodiments, the workflow of the interactive voice response and generative AI system 200 may continue with the first caller user 202 and the second caller user 204 providing authentication information, which may be verified utilizing an authentication hub 206. For example, in one embodiment, the IVR application server 208 may receive one or more respective sequences of dual-tone multi-frequency (DTMF) inputs corresponding, for example, to user authentication information (e.g., user full legal name, user personal identification number (PIN), user physical address, user date of birth, user email address, user marital status, and so forth) of the first caller user 202 and the second caller user 204.

In particular embodiments, the workflow of the interactive voice response and generative AI system 200 may continue with receiving one or more voice interactions 165 from the first caller user 202 and the second caller user 204. For example, in one embodiment, the one or more voice interactions 165 may include a potential request to initiate an execution of one or more interactions with the sensitive user profile data 155. In particular embodiments, the workflow of the interactive voice response and generative AI system 200 may continue with the interactive voice response and generative AI system 200 generating an initial voice interaction 165 to prompt the first caller user 202 and the second caller user 204 to perform a first utterance of a voice interaction 228 (e.g., speech and voice inputs of the first caller user 202) and a second utterance of a voice interaction 234 (e.g., speech and voice input of the second caller user 204), respectively.

In particular embodiments, the workflow of the interactive voice response and generative AI system 200 may continue with the IVR application server 208 detecting the first utterance of a voice interaction 228 and the second utterance of a voice interaction 234. For example, in particular embodiments, the IVR application server 208 may execute one or more speech-to-text (STT) algorithms or automatic speech recognition (ASR) algorithms suitable for transcribing the first utterance of a voice interaction 228 and the second utterance of a voice interaction 234 into one or more generated textual prompts 222. In particular embodiments, the workflow of the interactive voice response and generative AI system 200 may continue with the IVR application server 208 training and executing (e.g., in real-time or near real-time and during the current telephonic call) a first lightweight natural language processing (NLP) machine-learning model 224 to identify one or more speech characteristics and one or more voice characteristics 220 of the first caller user 202 based on the first utterance of a voice interaction 228 (e.g., speech and voice inputs of the first caller user 202).

In particular embodiments, the workflow of the interactive voice response and generative AI system 200 may further include the IVR application server 208 concurrently training and executing (e.g., in real-time or near real-time) a second lightweight natural language processing (NLP) machine-learning model 226 to identify one or more speech characteristics and one or more voice characteristics 220 of the second caller user 204 based on the second utterance of a voice interaction 234 (e.g., speech and voice inputs of the second caller user 204). It should be appreciated that, in accordance with the presently disclosed embodiments, the first lightweight NLP machine-learning model 224 and the second lightweight NLP machine-learning model 226 may each be trained and executed (e.g., in real-time or near real-time and during the current telephonic call) per caller user and per telephonic call.

That is, in accordance with the presently disclosed embodiments, the first lightweight NLP machine-learning model 224 and the second lightweight NLP machine-learning model 226 may each be trained and executed end-to-end in-session, such that the IVR application server 208 may present a generated voice interaction 218 in accordance with a speech, voice, and speech rate pattern specifically suited and personalized to each respective caller user 202, 204. In one embodiment, the first lightweight NLP machine-learning model 224 and the second lightweight NLP machine-learning model 226 may each include one or more of a lightweight bidirectional and auto-regressive transformer (BART) model, a lightweight bidirectional encoder representations for transformer (BERT) model, a lightweight knowledge enhanced bidirectional encoder representations for transformer (KnowBERT) model, a lightweight robustly optimized bidirectional encoder representations for transformer pretraining approach (ROBERTa) model, or a lightweight generative pre-trained transformer (GPT) model.

In particular embodiments, as further depicted by FIG. 2, the first lightweight NLP machine-learning model 224 and the second lightweight NLP machine-learning model 226 may each include respective natural language understanding (NLU) models 230 and 236 and respective natural language generation (NLG) models 232 and 238 (e.g., text-to-speech (TTS) models). In particular embodiments, the respective NLU models 230 and 236 may each include, for example, a natural language understanding (NLU) service suitable for identifying and classifying the speech and voice characteristics 220 of the first utterance of a voice interaction 228 (e.g., speech and voice inputs of the first caller user 202) and the second utterance of a voice interaction 234 (e.g., speech and voice inputs of the second caller user 204).

For example, in particular embodiments, the respective NLU models 230 and 236 may each identify and classify speech characteristics of the first utterance of a voice interaction 228 (e.g., speech and voice inputs of the first caller user 202) and the second utterance of a voice interaction 234 (e.g., speech and voice inputs of the second caller user 204) by interpreting and understanding one or more of a language, an accent, a dialect, a speech context, a speech complexity, a pause rate, a word length, a word frequency, a syntactic depth, a use of particles, a use of nouns, or a use of pronouns as used and intended in the first utterance of a voice interaction 228 (e.g., speech and voice inputs of the first caller user 202) and the second utterance of a voice interaction 234 (e.g., speech and voice inputs of the second caller user 204).

In addition to the aforementioned linguistic speech characteristics, the respective NLU models 230 and 236 may further identify and classify speech characteristics of the first utterance of a voice interaction 228 (e.g., speech and voice inputs of the first caller user 202) and the second utterance of a voice interaction 234 (e.g., speech and voice inputs of the second caller user 204) by interpreting and understanding one or more acoustic speech characteristics, such as Mel-frequency cepstral coefficient (MFCC) features. For example, in one embodiment, the MFCC features may include a mean of an 11th MFCC coefficient (MFCC mean 11), a variance of a first derivative of the 11th MFCC coefficient (MFCC var 25), or a variance of a first derivative of a 12th MFCC coefficient (MFCC var 26).

In particular embodiments, the respective NLU models 230 and 236 may each identify and classify voice characteristics of the first utterance of a voice interaction 228 (e.g., speech and voice inputs of the first caller user 202) and the second utterance of a voice interaction 234 (e.g., speech and voice inputs of the second caller user 204) by interpreting and understanding one or more of a tone, a pitch, a volume, a tempo, a timbre, a rate, a voice type, or a voice register as used and intended in the first utterance of a voice interaction 228 (e.g., speech and voice inputs of the first caller user 202) and the second utterance of a voice interaction 234 (e.g., speech and voice inputs of the second caller user 204).

In particular embodiments, the first lightweight NLP machine-learning model 224 and the second lightweight NLP machine-learning model 226 may each be further trained and executed (e.g., in real-time or near real-time and during the current telephonic call) to generate a personalized voice interaction 218 based on the identified speech and voice characteristics 220 of the first caller user 202 and the second caller user 204, respectively. For example, as further depicted by FIG. 2, the first lightweight NLP machine-learning model 224 and the second lightweight NLP machine-learning model 226 may utilize the respective NLG models 232 and 238 to generate a personalized voice interaction 218 in accordance with a speech, voice, and speech rate pattern specifically suited and personalized to each respective caller user 202, 204.

For example, in accordance with the presently disclosed embodiments, the first lightweight NLP machine-learning model 224 and the second lightweight NLP machine-learning model 226, utilizing the respective NLU models 230 and 236 and the respective NLG models 232 and 238, and having received the first utterance of a voice interaction 228 and the second utterance of a voice interaction 228, may generate a personalized voice interaction 218 that includes a personalized greeting (e.g., "Happy Birthday, Mr. Smith"; "Good afternoon, "Ms. Patel"; "Happy Anniversary, Mrs. Goldberg"; and so forth).

For example, in one embodiment, upon authenticating the first caller user 202 and the second caller user 204, the first lightweight NLP machine-learning model 224 and the second lightweight NLP machine-learning model 226 may be trained in real-time or near real-time to generate a personalized voice interaction 218 that includes a personalized greeting, which may be inferred based on the user authentication information (e.g., user full legal name, user personal identification number (PIN), user physical address, user date of birth, user email address, user marital status, and so forth) of the first caller user 202 and the second caller user 204.

In particular embodiments, the workflow of the interactive voice response and generative AI system 200 may further include the first lightweight NLP machine-learning model 224 and the second lightweight NLP providing the identified speech and voice characteristics 220, the first utterance of a voice interaction 228 and the second utterance of a voice interaction 234 to a large pretrained natural language processing (NLP) machine-learning model 240. In particular embodiments, the large pretrained NLP machining-learning model 240 may be a language model (LM) or a large language model (LLM) that may be pretrained (e.g., trained at some time prior to the current telephonic call) to identify an intent and one or more named entities of respective requests of the first caller user 202 and the second caller user 204 based on the identified speech and voice characteristics 220, the first utterance of a voice interaction 228, and the second utterance of a voice interaction 234.

In particular embodiments, the large pretrained NLP machining-learning model 240 may further generate a response to the respective requests of the first caller user 202 and the second caller user 204 and cause the execution of the one or more interactions with the sensitive user profile data 155 in accordance with the identified intent and the one or more named entities. For example, in particular embodiments, the large pretrained NLP machining-learning model 240 may include a large pretrained natural language understanding (NLU) model 242 and large pretrained natural language generation (NLG) model 244.

In particular embodiments, the large pretrained NLU model 242 may be suitable for identifying and classifying intent and one or more named entities of respective requests of the first caller user 202 and the second caller user 204 based on the identified speech and voice characteristics 220, the first utterance of a voice interaction 228, and the second utterance of a voice interaction 234 by interpreting and understanding the nuanced meanings, intentions, sentiments, semantics, and contexts embedded within or conveyed by the identified speech and voice characteristics 220, the first utterance of a voice interaction 228, and the second utterance of a voice interaction 234.

In a similar manner, the large pretrained NLG model 244 may be suitable for generating a natural language text response or a natural language speech response or voice response in a conversational manner in response to the large pretrained NLU model 242 identifying an intent and one or more named entities of respective requests of the first caller user 202 and the second caller user 204 based on the identified speech and voice characteristics 220, the first utterance of a voice interaction 228, and the second utterance of a voice interaction 234. For example, the large pretrained NLG model 244 may generate the natural language text response or the natural language speech response or voice response in accordance with the identified intent and one or more named entities in order to satisfy the respective requests of the first caller user 202 and the second caller user 204.

In particular embodiments, the large pretrained NLP machining-learning model 240 may operate in conjunction with the first lightweight NLP machine-learning model 224 and the second lightweight NLP machine-learning model 226 to create a user experience in which any natural language speech response or voice response generated and responsive to the identified intent and one or more named entities of the respective requests of the first caller user 202 and the second caller user 204 may be presented by the IVR application server 208 in a personalized generated voice interaction 218 that has a speech, voice, and speech rate pattern specifically suited and personalized to each respective caller user 202, 204.

In particular embodiments, as previously discussed, the interactive voice response and generative AI system 200 may include a centralized dialogue manager 212 that may, in some embodiments, be positioned between the IVR application server 208 and the respective first lightweight NLP machine-learning model 224 and the second lightweight NLP machine-learning model 226. Specifically, in particular embodiments, the centralized dialogue manager 212 may include a software service component suitable for managing and streamlining the conversational dialogue flows between the IVR application server 208 and the respective first lightweight NLP machine-learning model 224 and the second lightweight NLP machine-learning model 226 and between the IVR application server 208 and the respective first caller user 202 and the second caller user 204. For example, the centralized dialogue manager 212 may manage and streamline the conversational dialogue flows by more efficiently managing, for example, the conversational dialogues 214 and voice response prompts 216 that may be associated with each of a large number of interaction flows responsive to the different requests of the first caller user 202 and the second caller user 204.

In particular embodiments, the centralized dialogue manager 212 may leverage and utilize the identified speech and voice characteristics 220 as generated by the first lightweight NLP machine-learning model 224 and the second lightweight NLP machine-learning model 226 to dynamically adjust one or more IVR response features associated with the IVR application server 208 and/or the personalized generated voice interaction 218. For example, in particular embodiments, the centralized dialogue manager 212 may dynamically adjust one or more of a silence duration between different conversational dialogues 214 and/or voice response prompts 216, a number of personalized generated voice interactions 218 to be attempted during a telephonic call with the respective first caller user 202 and the second caller user 204, a speech confidence level, or a timeout duration for terminating respective telephonic calls with the first caller user 202 and the second caller user 204.

In particular embodiments, the centralized dialogue manager 212 may then apply the dynamically adjusted IVR response features to the personalized generated voice interaction 218, such that the IVR application server may present the personalized generated voice interaction 218 to the first caller user 202 and the second caller user 204, respectively, in accordance with the dynamically adjusted IVR response features. In particular embodiments, the centralized dialogue manager 212 may further apply the dynamically adjusted IVR response features to each of the conversational dialogues 214 and voice response prompts 216 that may be associated with respective interaction flows responsive to the different requests of the first caller user 202 and the second caller user 204.

In particular embodiments, the interaction flows may each correspond to a sequence of voice response interactions between the IVR application server 208 and the first caller user 202 and the second caller user 204, respectively, to satisfy the respective requests of the first caller user 202 and the second caller user 204. For example, the various interaction flows may include an access interaction flow for accessing and viewing sensitive user profile data 155, a data unit transfer interaction flow for transferring data units between different sensitive user profiles, an application instantiation interaction flow for opening one or more new sensitive user profiles, a third-party profile linking interaction flow for linking a sensitive user profile to a third-party user profile associated with the same user, a physical card or virtual card instantiation interaction flow for instantiating a new or an updated physical card or virtual card that may be associated with a user's sensitive user profile, or other interaction flow that may utilized to appropriately satisfy the respective requests of the first caller user 202 and the second caller user 204.

In particular embodiments, because respective interaction flows responsive to the different requests of the first caller user 202 and the second caller user 204 may be each associated with its own set of conversational dialogues 214 and voice response prompts 216, the centralized dialogue manager 212 may be further utilized to manage and streamline the conversational dialogue flows between the IVR application server 208 and the respective first lightweight NLP machine-learning model 224 and the second lightweight NLP machine-learning model 226 and between the IVR application server 208 and the first caller user 202 and the second caller user 204 by selecting the interaction flows in accordance with the identified intent and one or more named entities in order to satisfy the respective requests of the first caller user 202 and the second caller user 204.

For example, the centralized dialogue manager 212 may be suitable for managing and streamlining the conversational dialogue flows by leveraging the fact that particular conversational dialogues 214 and voice response prompts 216 that may be associated with particular interaction flows responsive to a particular request of the first caller user 202 or the second caller user 204, for example, may often include playbacks, repeats, or routine conversational dialogues 214 and voice response prompts 216. Thus, in such instances, the centralized dialogue manager 212 may not have to execute any calls to the respective first lightweight NLP machine-learning model 224 and the second lightweight NLP machine-learning model 226 for generating new personalized generated voice interactions 218, and may, instead, simply cause the IVR application server 208 to playback previous conversational dialogues 214 and voice response prompts 216 associated with the particular interaction flow responsive to the particular request of the first caller user 202 or the second caller user 204.

Figure 3:
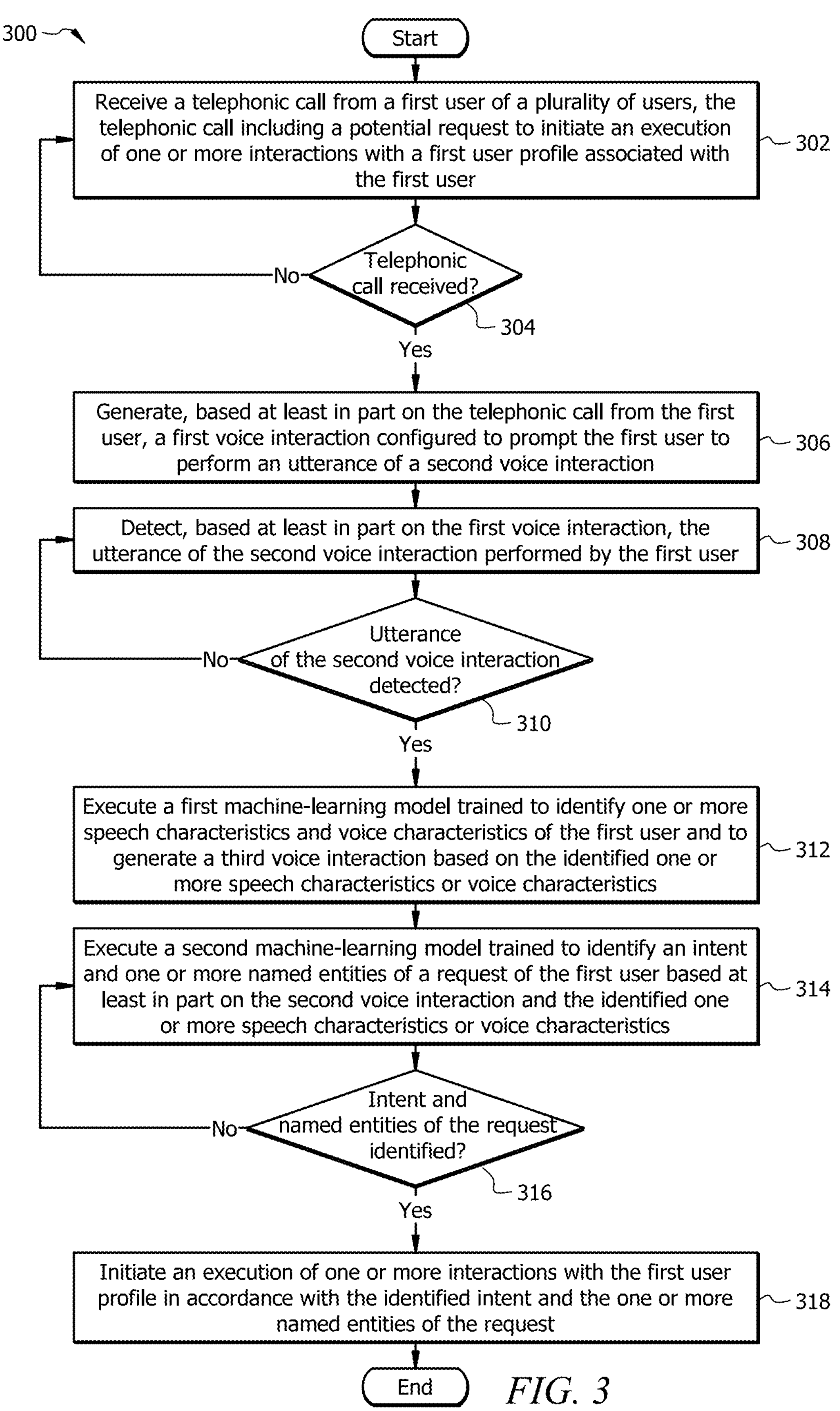
FIG. 3 illustrates a flowchart of an example method for generating user specific interactive voice responses based on user speech and voice characteristics, in accordance with one or more embodiments of the present disclosure.

FIG. 3 illustrates a flowchart of an example method 300 for generating user specific interactive voice responses based on user speech and voice characteristics, in accordance with one or more embodiments of the present disclosure. The method 300 may be performed utilizing the first computing system 140 as described above with respect to FIG. 1. The method 300 may begin at block 302 with the first computing system 140 receiving a telephonic call from a first user of a plurality of users, in which the telephonic call includes a potential request to initiate an execution of one or more interactions with a first user profile associated with the first user. In one embodiment, the caller user 102 may make a telephonic call to the CTI and IVR system 100 associated with an organization or a call center, for example. In particular embodiments, the caller user 102 may execute one or more telephonic calls to the CTI and IVR system 100 by way of a PTSN network or a VoIP network.

The method 300 may continue at decision 304 with the first computing system 140 determining whether a telephonic call has been received. For example, in response to determining that telephonic call has not been received, the method 300 may return to block 302 as discussed above. On the other hand, in response to determining that telephonic call has been received, the method 300 may then continue at block 306 with the first computing system 140 generating, based at least in part on the telephonic call from the first user, a first voice interaction configured to prompt the first user to perform an utterance of a second voice interaction. For example, in particular embodiments, the IVR application server 208 may generate one or more initial voice interactions 165, which may prompt the caller user 102 to speak an utterance of a voice interaction, such as a request.

The method 300 may continue at block 308 with the first computing system 140 detecting, based at least in part on the first voice interaction, the utterance of the second voice interaction performed by the first user. For example, in particular embodiments, the first computing system 140 may capture the speech of the caller user 102 while the caller user 102 makes a request or responds to one or more specific voice prompts provided by the IVR application server 208. The method 300 may continue at decision 310 with the first computing system 140 determining whether the utterance of the second voice interaction has been adequately detected. In response to determining that the utterance of the second voice interaction has not been adequately detected, the method 300 may return to block 308 and the IVR application server 208 may continue attempting to capture the speech of the caller user 102.

On the other hand, in response to determining that the utterance of the second voice interaction has been adequately detected, the method 300 may then continue at block 312 with the first computing system 140 executing a first machine-learning model trained to identify one or more speech characteristics and voice characteristics of the first user and to generate a third voice interaction based on the identified one or more speech characteristics or the identified one or more voice characteristics. For example, in particular embodiments, the first generative machine-learning model (e.g., lightweight NLP model 224) may be trained or fine-tuned and executed to identify one or more speech characteristics and one or more voice characteristics of the caller user 102 and to generate one or more voice interactions 165 in accordance with the identified one or more speech characteristics or the identified one or more voice characteristics of the caller user 102.

The method 300 may continue at block 314 with the first computing system 140 executing a second machine-learning model trained to identify an intent and one or more named entities of a request of the first user based at least in part on the second voice interaction and the identified one or more speech characteristics or the identified one or more voice characteristics. For example, in particular embodiments, the second generative machine-learning model (e.g., large pretrained NLP model 240) may be pretrained and executed to identify an intent and one or more named entities of a request of the caller user 102. The method 300 may continue at decision 316 with the first computing system 140 determining whether the intent and the one or more named entities have been accurately identified.

In response to determining that the intent and the one or more named entities have not been accurately identified, the method 300 may return to block 314 as previously discussed. On the other hand, in response to determining that the intent and the one or more named entities have been accurately identified, the method 300 may then continue at block 312 with the first computing system 140 initiating an execution of one or more interactions with the first user profile in accordance with the identified intent and the one or more named entities of the request. For example, in one embodiment, the first computing system 140 may initiate an execution of one or more interactions with the first user profile to execute a predetermined action.

Thus, in accordance with the presently disclosed embodiments, the interactive voice response and generative AI system 200 may improve processor 142 and memory 150 computing resources of the computer telephony integration (CTI) and interactive voice response (IVR) system 100 by providing an interactive voice response and generative AI system 200 that includes 1) a first generative machine-learning model (e.g., lightweight NLP model 224) trained and executed to identify one or more speech characteristics and one or more voice characteristics of a caller user 102 and to generate a voice interaction based on the identified one or more speech characteristics or the identified one or more voice characteristics and 2) a second generative machine-learning model (e.g., large pretrained NLP model 240) pretrained and executed to identify an intent and one or more named entities of a request of the caller user 102.

In this way, the interactive voice response and generative AI system 200 as disclosed herein may respond to, and satisfy, various caller user 102 requests in real-time or near real-time in accordance with a speech, voice, and speech rate pattern specifically suited and personalized to the caller user 102 without accumulating large volumes of calls within a call queue system or rerouting large volumes of calls as otherwise required when caller users request to speak with service representatives. Additionally, because the interactive voice response and generative AI system 200 more efficiently and more readily identifies intent and one or more named entities of a caller user request by engaging with the caller user 102 in a speech, voice, and speech rate pattern specifically suited and personalized to the caller user 102, the interactive voice response and generative AI system 200 may decrease network 110 traffic by seamlessly routing calls to appropriate automated services in accordance with the identified intent and one or more named entities as opposed to rerouting large volumes of calls to various service representatives. Thus, the present embodiments reduce execution time, latency, and processing workloads of the processor 142, increase the storage compacity of the memory 150, and decrease network 110 traffic.

Figure 4:
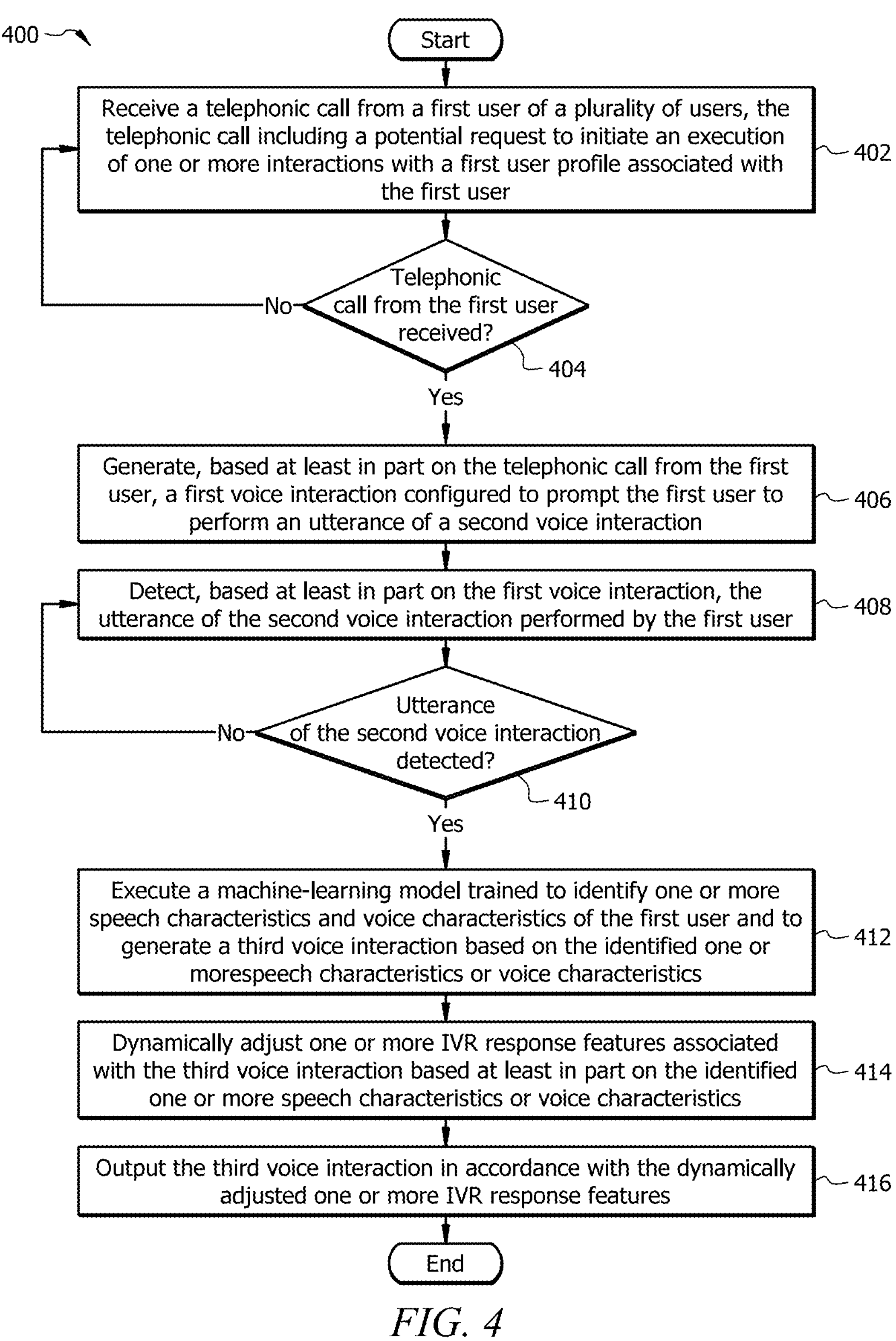
FIG. 4 illustrates a flowchart of an example method for dynamically adjusting interactive voice response features based on user speech characteristics, in accordance with one or more embodiments of the present disclosure.

FIG. 4 illustrates a flowchart of an example method 400 for dynamically adjusting interactive voice response features based on user speech characteristics, in accordance with one or more embodiments of the present disclosure. The method 400 may be performed utilizing the first computing system 140 as described above with respect to FIG. 1. The method 400 may begin at block 402 with the first computing system 140 receiving a telephonic call from a first user of a plurality of users, in which the telephonic call includes a potential request to initiate an execution of one or more interactions with a first user profile associated with the first user. In one embodiment, the caller user 102 may make a telephonic call to the CTI and IVR system 100 associated with an organization or a call center, for example. In particular embodiments, the caller user 102 may execute one or more telephonic calls to the CTI and IVR system 100 by way of a PTSN network or a VoIP network.

The method 400 may continue at decision 404 with the first computing system 140 determining whether a telephonic call has been received. For example, in response to determining that telephonic call has not been received, the method 400 may return to block 402 as discussed above. On the other hand, in response to determining that telephonic call has been received, the method 400 may then continue at block 406 with the first computing system 140 generating, based at least in part on the telephonic call from the first user, a first voice interaction configured to prompt the first user to perform an utterance of a second voice interaction. For example, in particular embodiments, the IVR application server 208 may generate one or more initial voice interactions 165, which may prompt the caller user 102 to speak an utterance of a voice interaction, such as a request.

The method 400 may continue at block 408 with the first computing system 140 detecting, based at least in part on the first voice interaction, the utterance of the second voice interaction performed by the first user. For example, in particular embodiments, the first computing system 140 may capture the speech of the caller user 102 while the caller user 102 makes a request or responds to one or more specific voice prompts provided by the IVR application server 208. The method 400 may continue at decision 410 with the first computing system 140 determining whether the utterance of the second voice interaction has been accurately detected. In response to determining that the utterance of the second voice interaction has not been adequately detected, the method 400 may return to block 408 and the IVR application server 208 may continue attempting to capture the speech of the caller user 102.

On the other hand, in response to determining that the utterance of the second voice interaction has been adequately detected, the method 400 may then continue at block 412 with the first computing system 140 executing a machine-learning model trained to identify one or more speech characteristics and voice characteristics of the first user and to generate a third voice interaction based on the identified one or more speech characteristics or the identified one or more voice characteristics. For example, in particular embodiments, the generative machine-learning model (e.g., lightweight NLP model 224) may be trained or fine-tuned and executed to identify one or more speech characteristics and one or more voice characteristics of the caller user 102 and to generate one or more voice interactions 165 in accordance with the identified one or more speech characteristics or the identified one or more voice characteristics of the caller user 102.

The method 400 may continue at block 414 with the first computing system 140 dynamically adjust one or more IVR response features associated with the third voice interaction based at least in part on the identified one or more speech characteristics or the identified one or more voice characteristics. For example, in particular embodiments, the first computing system 140 may dynamically adjust one or more of a silence duration, a number of voice interactions to attempt, a speech confidence level, or a timeout duration that may be associated with the presentation of the generated voice interaction 218.

The method 400 may then conclude at block 416 with the first computing system 140 outputting the third voice interaction in accordance with the dynamically adjusted one or more IVR response features. For example, in particular embodiments, the centralized dialogue manager 212 may allow the IVR application server 208 to output the personalized generated voice interaction 218 in accordance with, for example, variations in the silence duration, the number of voice interactions to attempt, the speech confidence level, and the timeout duration specific to the speech, voice, and speech rate pattern suited and personalized to the caller user 102. In particular embodiments, the centralized dialogue manager 212 may further apply the dynamically adjusted one or more IVR response features to one or more interaction flows of a plurality of interaction flows selected in accordance with the intent and one or more named entities identified in the caller user request.

Thus, in accordance with the presently disclosed embodiments, the interactive voice response and generative AI system 200 may improve processor 142 and memory 150 computing resources of the computer telephony integration (CTI) and interactive voice response (IVR) system 100 by providing an interactive voice response and generative artificial intelligence (AI) system that includes 1) a generative machine-learning model (e.g., first lightweight NLP model 224) trained and executed to identify one or more speech characteristics and voice characteristics of a caller user and to generate a voice interaction in accordance with the identified speech and voice characteristics and 2) a centralized dialogue manager 212 utilized to dynamically adjust one or more IVR response features of the voice interaction, such that the voice interaction is outputted in accordance with the dynamically adjusted one or more IVR response features. The centralized dialogue manager 212 may further apply the dynamically adjusted one or more IVR response features to one or more interaction flows of a plurality of interaction flows selected in accordance with an intent and one or more named entities of the caller user 102 request.

In this way, the interactive voice response and generative AI system 200 as disclosed herein may respond to, and satisfy, various caller user requests in real-time or near real-time in accordance with a speech, voice, and speech rate pattern specifically suited and personalized to the caller user 102 without accumulating large volumes of calls within a call queue system or rerouting large volumes of calls as otherwise required when caller users 102 request to speak with service representatives. Additionally, by providing the centralized dialogue manager 212 to dynamically adjust the one or more IVR response features, and further to apply the dynamically adjusted one or more IVR response features to the one or more voice interaction flows for satisfying caller user 102 request, the interactive voice response and generative AI system 200 may decrease network traffic by more efficiently resolving caller user 102 intent and satisfying caller user 102 requests within a few short voice interactions of a voice interaction flow as opposed to having to continuously regenerate and repeat various voice interaction flows. Thus, the present embodiments reduce execution time, latency, and processing workloads of processor 142, increase the storage compacity of system memory 150, and increase network 110 efficiency.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory configured to store a plurality of user profiles associated with a plurality of users and an interactive voice response (IVR) system configured to service calls with respect to the plurality of user profiles; and one or more processors operably coupled to the memory and configured to:

receive a call from a first user of the plurality of users, wherein the call comprises a potential request to initiate an execution of one or more interactions with a first user profile associated with the first user, and, in response:

generate, based at least in part on the call from the first user, a first voice interaction configured to prompt the first user to perform an utterance of a second voice interaction;

detect, based at least in part on the first voice interaction, the utterance of the second voice interaction performed by the first user;

in response to detecting the utterance of the second voice interaction, execute a first machine-learning model trained to identify speech characteristics and voice characteristics of the first user and to generate, based at least in part on the identified speech characteristics and the identified one or more voice characteristics, a third voice interaction reflective of the identified speech characteristics and the identified voice characteristics, wherein the third voice interaction comprises a personalized generated voice interaction including a speech and a voice personalized to the first user;

provide the third voice interaction to the first user;

execute a second machine-learning model trained to identify an intent and one or more named entities of a request of the first user based at least in part on the second voice interaction and the identified speech characteristics and the identified voice characteristics; and in response to identifying the intent and the one or more named entities of the request of the first user, initiate the execution of the one or more interactions with the first user profile in accordance with the identified intent and the one or more named entities of the request.

2. The system of claim 1, wherein the first machine-learning model comprises a first natural language processing (NLP) model trained or fine-tuned based on the identified speech characteristics and the identified voice characteristics.

3. The system of claim 2, wherein the first natural language processing (NLP) model comprises one or more of a bidirectional and auto-regressive transformer (BART) model, a bidirectional encoder representations for transformer (BERT) model, a knowledge enhanced bidirectional encoder representations for transformer (KnowBERT) model, a robustly optimized bidirectional encoder representations for transformer pretraining approach (ROBERTa) model, or a generative pre-trained transformer (GPT) model.

4. The system of claim 1, wherein the second machine-learning model comprises a second natural language processing (NLP) model pretrained to identify intent and one or more named entities from a plurality of different utterances of voice interactions performed by the plurality of users.

5. The system of claim 1, wherein the identified speech characteristics comprises one or more of a language, an accent, a dialect, a speech context, a speech complexity, a pause rate, a word length, a word frequency, a syntactic depth, a use of particles, a use of nouns, or a use of pronouns.

6. The system of claim 1, wherein the identified voice characteristics comprises one or more of a tone, a pitch, a volume, a tempo, a timbre, a rate, a voice type, or a voice register.

7. The system of claim 1, wherein the personalized generated voice interaction includes the speech, the voice, and a speech rate pattern personalized to the first user.

8. The system of claim 1, wherein the one or more processors are further configured to initiate the execution of the one or more interactions with the first user profile to execute a predetermined action.

9. A method, comprising:

receiving a call from a first user of a plurality of users, wherein the call comprises a potential request to initiate an execution of one or more interactions with a first user profile of a plurality of user profiles associated with a plurality of users, wherein the first user profile is associated with a first user, and wherein the call is received by an interactive voice response (IVR) system configured to service calls with respect to the plurality of user profiles, and, in response:

generating, based at least in part on the call from the first user, a first voice interaction configured to prompt the first user to perform an utterance of a second voice interaction;

detecting, based at least in part on the first voice interaction, the utterance of the second voice interaction performed by the first user;

in response to detecting the utterance of the second voice interaction, executing a first machine-learning model trained to identify speech characteristics and voice characteristics of the first user and to generate, based at least in part on the identified speech characteristics and the identified voice characteristics, a third voice interaction reflective of the identified speech characteristics and the identified voice characteristics, wherein the third voice interaction comprises a personalized generated voice interaction including a speech and a voice personalized to the first user;

providing the third voice interaction to the first user;

executing a second machine-learning model trained to identify an intent and one or more named entities of a request of the first user based at least in part on the second voice interaction and the identified speech characteristics and the identified voice characteristics; and in response to identifying the intent and the one or more named entities of the request of the first user, initiating the execution of the one or more interactions with the first user profile in accordance with the identified intent and the one or more named entities of the request.

10. The method of claim 9, wherein the first machine-learning model comprises a first natural language processing (NLP) model trained or fine-tuned based on the identified speech characteristics and the identified voice characteristics.

11. The method of claim 10, wherein the first natural language processing (NLP) model comprises one or more of a bidirectional and auto-regressive transformer (BART) model, a bidirectional encoder representations for transformer (BERT) model, a knowledge enhanced bidirectional encoder representations for transformer (KnowBERT) model, a robustly optimized bidirectional encoder representations for transformer pretraining approach (ROBERTa) model, or a generative pre-trained transformer (GPT) model.

12. The method of claim 9, wherein the second machine-learning model comprises a second natural language processing (NLP) model pretrained to identify intent and one or more named entities from a plurality of different utterances of voice interactions performed by the plurality of users.

13. The method of claim 9, wherein the identified speech characteristics comprises one or more of a language, an accent, a dialect, a speech context, a speech complexity, a pause rate, a word length, a word frequency, a syntactic depth, a use of particles, a use of nouns, or a use of pronouns.

14. The method of claim 9, wherein the identified voice characteristics comprises one or more of a tone, a pitch, a volume, a tempo, a timbre, a rate, a voice type, or a voice register.

15. The method of claim 9, wherein personalized generated voice interaction includes the speech, the voice, and a speech rate pattern personalized to the first user.

16. The method of claim 9, wherein initiating the execution of the one or more interactions with the first user profile comprises initiating the execution of the one or more interactions with the first user profile to execute a predetermined action.

17. A non-transitory computer-readable medium storing instructions that, when executed by one or more processors, cause the one or more processors to:

receive a call from a first user of a plurality of users, wherein the call comprises a potential request to initiate an execution of one or more interactions with a first user profile of a plurality of user profiles associated with a plurality of users, wherein the first user profile is associated with a first user, and wherein the call is received by an interactive voice response (IVR) system configured to service calls with respect to the plurality of user profiles, and, in response:

generate, based at least in part on the call from the first user, a first voice interaction configured to prompt the first user to perform an utterance of a second voice interaction;

detect, based at least in part on the first voice interaction, the utterance of the second voice interaction performed by the first user;

in response to detecting the utterance of the second voice interaction, execute a first machine-learning model trained to identify speech characteristics and voice characteristics of the first user and to generate, based at least in part on the identified speech characteristics and the identified voice characteristics, a third voice interaction reflective of the identified speech characteristics and the identified voice characteristics, wherein the third voice interaction comprises a personalized generated voice interaction including a speech and a voice personalized to the first user;

provide the third voice interaction to the first user;

execute a second machine-learning model trained to identify an intent and one or more named entities of a request of the first user based at least in part on the second voice interaction and the identified speech characteristics and the identified voice characteristics; and in response to identifying the intent and the one or more named entities of the request of the first user, initiate the execution of the one or more interactions with the first user profile in accordance with the identified intent and the one or more named entities of the request.

18. The non-transitory computer-readable medium of claim 17, wherein the first machine-learning model comprises a first natural language processing (NLP) model trained or fine-tuned based on the identified speech characteristics and the identified voice characteristics.

19. The non-transitory computer-readable medium of claim 18, wherein the first natural language processing (NLP) model comprises one or more of a bidirectional and auto-regressive transformer (BART) model, a bidirectional encoder representations for transformer (BERT) model, a knowledge enhanced bidirectional encoder representations for transformer (KnowBERT) model, a robustly optimized bidirectional encoder representations for transformer pretraining approach (ROBERTa) model, or a generative pretrained transformer (GPT) model.

20. The non-transitory computer-readable medium of claim 17, wherein the second machine-learning model comprises a second natural language processing (NLP) model pretrained to identify intent and one or more named entities from a plurality of different utterances of voice interactions performed by the plurality of users.

* * * * *